(12) United States Patent
Fabian (10) Patent No.: US 7,055,254 B1
(45) Date of Patent: Jun. 6, 2006

(54) TILTSENSOR

(75) Inventor: Marcus Fabian, Bremen (DE)

(73) Assignee: Universitat Bremen, Bremen (DE)

( * ) Notice: Subject to any disclaimer, the term of this patent is extended or adjusted under 35 U.S.C. 154(b) by 0 days.

(21) Appl. No.: 10/997,390

(22) Filed: Nov. 24, 2004

(51) Int. Cl.
*G01C 9/06* (2006.01)

(52) U.S. Cl. .................. 33/366.15; 33/366.11; 33/366.18; 33/366.22

(58) Field of Classification Search ............ 33/366.11, 33/366.12, 366.15, 366.17, 366.18, 366.19, 33/366.21, 366.22, 366.25, 366.26
See application file for complete search history.

(56) References Cited

U.S. PATENT DOCUMENTS

| | | | |
|---|---|---|---|
| 2,713,726 A | | 7/1955 | Dixson |
| 4,536,967 A | * | 8/1985 | Beitzer ............... 33/366.21 |
| 5,630,280 A | * | 5/1997 | Crossan, Jr. ............ 33/366.11 |
| 6,516,527 B1 | * | 2/2003 | Moriyasu ............... 33/366.15 |
| 6,628,373 B1 | * | 9/2003 | Kahle ............... 33/366.11 |
| 6,725,554 B1 | * | 4/2004 | Gersak ............... 33/366.15 |
| 6,802,132 B1 | * | 10/2004 | Olson ............... 33/366.15 |

FOREIGN PATENT DOCUMENTS

| | | |
|---|---|---|
| DE | 100 45 306 A1 | 3/2002 |
| DE | 101 17 257 A1 | 10/2002 |
| DE | 102 03 231 C1 | 9/2003 |
| DE | 102 17 859 C1 | 9/2003 |
| DE | 197 17 580 C2 | 12/2003 |
| DE | 198 21 923 B4 | 4/2004 |
| EP | 1 227 298 A1 | 1/2002 |
| EP | 1 245 928 A1 | 3/2002 |
| WO | WO 99/63305 A3 | 12/1999 |
| WO | WO 09/13061 A2 | 2/2001 |
| WO | WO 03/054476 A2 | 7/2003 |

OTHER PUBLICATIONS

User's Manual Series 755, 756 and 757 Miniature Tilt Sensors Serial No. 5865, Applied Geomechnics Incorporate (2000).

Monitoring Ground Deformation at the Decade Volcano Gunung Merapi, Indonesia, Phys. Chem. Earth (A), vol. 25, No. 9-11, pp. 755-757 (Rebscher et al.)(2000).

(Continued)

*Primary Examiner*—Yaritza Guadalupe
(74) *Attorney, Agent, or Firm*—Laurence P. Colton; Powell Goldstein LLP (57) ABSTRACT

An adjustment-free tiltsensor for application in the fields of geodesy, geophysics and geotechnics, with a tilt angle measuring range greater than ±5° to ±10° and an essentially enhanced angular resolution better than 1 microradiant, in which an electrolytic liquid and a gas bubble are present in a closed spirit level, the spirit level is curved over an angle of up to 360°, a plurality of electrode configurations each having a plurality of electrodes are arranged along the spirit level for sensing the position of the gas bubble, the electrodes are in electric contact with the electrolytic liquid, and the electrodes are connected to a first electronic circuit, by means of which the electric quantities between selected electrodes can be measured.

15 Claims, 6 Drawing Sheets

OTHER PUBLICATIONS

Applied Geomechanics promotional literature for Model 510 Geodetic Borehole Tiltmeter (Biaxial)(2001).

Investigation of Ground and Object Motions at the TV Tower in Sopron, Hungary, Acta Geod. Geoph. Hung., vol. 36(4), pp. 391-398 (Mentes et al)(2001).

Monitoring of Fluid Injection and Soil Consolidation Using Surface Tilt Measurements, J. Geotech. and Geoenv. Eng., vol. 124, No. 1, pp. 32-37 (Vsco et al)(Jan. 1998).

Strainmeters and Tiltmeters, Rev. of Geophys., vol. 24, No. 3, pp. 579-624 (Agnew)(Aug. 1986).

* cited by examiner

TILTSENSOR

BACKGROUND OF THE INVENTION

1. Field of the Invention

The invention relates to a high-resolution, preferably adjustment-free tiltsensor and a method for determining the tilt angle of the tiltsensor.

2. Description of the Related Art

The use of high-resolution tiltsensors is known in the fields of geodesy, geophysics and geotechnics. A resolution of one microradiant or better is required in order to measure tiniest movements of objects. This high resolution is achieved by specially designed methods and sophisticated circuitry, but also by accepting a small measuring range of the tilt angle. The latter usually lies at approximately ±1. These tiltsensors have a curved spirit level that contains an electrically conducting (electrolytic) liquid as well as a small gas bubble. The position of the gas bubble varies according to the tilt of the spirit level and is scanned by three electrodes. Such a high-resolution constructive design is shown in the User's Manual Series 755, 756 and 757 Miniature Tilt Sensors, Applied Geomechanics Inc., Santa Cruz, Calif. 95062 USA.

Due to the small measuring range available at high resolution, plumb (vertical) adjustment is necessary. Only then it is possible to take advantage of the small measuring range. The effort involved in adjustment for the installation of a single tiltsensor, which is typically meant to provide measurement results for a period of months or even years, is relatively minor. Adjustment expenses become significant at the latest when, in the course of long-term measurements, it becomes apparent that the measuring range will be exceeded and that a readjustment of the tiltsensor will become necessary. Readjustment generally makes measurements difficult and costly. The effort put into adjustment is also particularly relevant in conjunction with the installation of a large number of tiltsensors, for example when a large surface area must be covered by several tiltsensors to measure deformations in the earth's surface. Finally, applications are presently available which allow little or no adjustment, for example in the installations of tiltsensors in extreme environments, such as at the edge of volcanoes or along the sea bed.

In order to achieve high angular resolution and precision, an angle calibration is made on the tiltsensor. This means that the electric output signals supplied by the electrodes are assigned to the correct angular quantities on the basis of standardized comparison measurements.

The object of the invention is to develop a tiltsensor which has a tilt angle measuring range that is significantly greater than about ±5° or even greater than about ±10° and at the same time exhibits a significantly better angular resolution than 1 microradiant. In addition, the sensor should be simple to manufacture, yet be less susceptible to malfunctioning, have a high lifetime stability and be economical to service. A tiltsensor described in the User's Manual Series 755, 756 and 757 Miniature Tilt Sensors, Applied Geomechanics Inc., Santa Cruz, Calif. 95062 USA features these characteristics, but fails to provide the desired, enlarged tilt angle measuring range.

BRIEF SUMMARY OF THE INVENTION

The adjustment-free tiltsensor according to the invention has the following features:
a) an electrolytic liquid and a gas bubble are present in a spirit level,
b) the spirit level is curved over an angle of up to 360°,
c) for sensing the position of the gas bubble, a plurality of electrode configurations, each having a plurality of electrodes, are arranged along the spirit level,
d) the electrodes are in electric contact with the electrolytic liquid, and
e) the electrodes are connected to a first electronic circuit, by means of which the electric quantities, e.g. the resistance, between selected electrodes can be measured.

While the known tiltsensor is provided with exactly one electrode configuration having three electrodes, the tiltsensor according to the invention has a plurality of electrode configurations, each with a plurality of electrodes along the spirit level. As a result of the larger number of electrode configurations, the tilt angle measuring range is expanded practically to any arbitrary extent.

According to a further embodiment of the invention, the tiltsensor has a second electronic circuit. The first electronic circuit is being provided for the coarse determination of the location of the gas bubble and the second electronic circuit for the high-resolution determination of the location of the gas bubble within the spirit level. Both electronic circuits are constructed such that it is possible to carry out a common calibration of the sensor and the two circuits.

According to a further embodiment of the invention, the first electronic circuit is provided for selecting the electrode configuration within which the gas bubble is located or which configuration is closest to the gas bubble. Here the second electronic circuit is provided for determining the location of the gas bubble within the electrode configuration selected by the first circuit. This makes it possible to achieve the high-resolution determination of the location of the gas bubble by evaluating only the electric output quantities of a single (the selected) electrode configuration.

According to a further embodiment of the invention, one or more of the electrode configurations each comprise three electrodes, and that within each electrode configuration one electrode is arranged on one side of the spirit level and the other electrodes are essentially arranged on the opposite side of the spirit level. This placement of electrodes makes use of the principle of electrode arrangement disclosed in the known tiltsensor of Applied Geomechanics. This construction has proven to be very reliable and robust.

According to a further embodiment of the invention, successive electrode configurations are arranged along the spirit level offset to each other at fixed angles such that the ranges of tilt angle measurement covered by the electrode configurations overlap one another or at least follow one another in seamless succession. This prevents any non-linearity effects in the marginal regions of the electrode configurations.

According to a further embodiment of the invention, at least one electrode belongs to more than one electrode configuration. In the ideal case, each electrode is employed in more than one electrode configuration. This reduces expenses in the constructive design of the tiltsensor.

According to a further embodiment of the invention, a plurality of electrode configurations are provided along the spirit level, with adjacent electrode configurations spatially overlapping one another, and with each configuration sharing at least one electrode. This embodiment also improves the measuring range and economizes on the costs of the constructive design.

According to a further embodiment of the invention, the adjacent electrode configurations, and thus the associated ranges of tilt angle measurement, overlap by 50%.

According to a further embodiment of the invention, pairs of opposing electrodes are provided along the spirit level. But here an electrode configuration is not formed by the electrode pairs located directly opposite one another, but rather with the electrodes adjacent to the opposite electrode. In a particularly uncomplicated manner, this arrangement makes it possible to achieve a 50% overlap in the tilt angle measuring ranges, with the majority of the electrodes being employed in at least two electrode configurations (apart from the marginal regions of the spirit level).

According to a further embodiment of the invention, the expansion of the gas bubble along the spirit level is not greater than the distance between two electrodes within an electrode configuration. The expansion of the gas bubble can also be 50% or lesser of the distance between two electrodes. This leads to a better overlapping of measuring ranges of adjacent electrode configurations.

According to a further embodiment of the invention, the electrodes exhibit a practically punctiform contact surface in relationship to the geometric expansion of the gas bubble in the electrolytic liquid. The contact surface of the electrodes has a size of approximately 0.1 $mm^2$ or less, preferably 0.05 $mm^2$. This results in a further enhancement of resolution. The ratio of the size of the contact surface to the surface of the spirit level bathed by the gas bubble is approximately 1:200 to 1:1000, preferably 1:500.

According to a further embodiment of the invention is that, with the inclusion of the first electronic circuit, the second electronic circuit in particular is calibrated for all electrode configurations individually and, in addition, beyond the overall sensor measuring range. The second electronic circuit is first used to calibrate the position of the gas bubble within each individual electrode configuration. The precisely ascertained central position of the gas bubble in each electrode configuration is then used to determine the exact angular separation of the electrode configurations (i.e. of their central position) to each other, and thereby the first circuit is calibrated. Thus, by using the second electronic circuit to evaluate the electric quantities of each of the electrode configurations, while including the results of the first circuit, measurements of highest resolution and precision can be achieved.

A tiltsensor according to the invention can also have two spirit levels arranged orthogonally to one another and each having its associated electronic circuits. This allows the tiltsensor to sense angular changes in every horizontal direction with respect to its installed position and the plumb line. The tiltsensor therefore no longer has to be adjusted during installation.

According to the invention, the spirit level with the electrode configurations extends across an angle of ±5–10°. The preferred fields of applications are geotechnics, geodesy, and geophysics, in particular for measuring tilt angles in building structures or rock formations.

According to a further embodiment of the invention, the spirit level with the electrode configurations can also extend over an angle of ±30–40°. The preferred areas of application for this embodiment are locations that are particularly difficult to access, such as the sea floor. Tiltsensors having such a large tilt angle measuring range can be installed without costly adjustments and operated for a long period of time.

The method according to the invention for determining the tilt of a tiltsensor with a spirit level, electrolytic liquid, gas bubble and electrode configurations arranged along the spirit level, with each electrode configurations being provided with a plurality of electrodes, has the following features:

a) First, a first electronic circuit is employed on the basis of its calibration to determine the electrode configuration which is closest to, or which contains, the gas bubble.

Here the individual electrode configurations, due to the construction of the sensor, exhibit fixed angular separations to each other that are precisely known from the calibration process. One of these electrode configurations, preferably the one arranged at the center of the spirit level, can be selected as the reference electrode configuration. By including the known angular separations of the electrode configurations to each other, the first electronic circuit is therefore capable of determining a first (coarse) tilt angle, specifically the angle between the electrode configuration determined by the first electronic circuit, on one hand, and the reference electrode configuration, on the other.

b) In a second step, the electrode configuration lying closest to the gas bubble is employed, in particular by switching to a second electronic circuit, to determine at high resolution the position of the gas bubble within the electrode configuration. Here the second (highest resolved) tilt angle is determined with respect to the first (coarse) tilt angle of the selected electrode configuration. Finally, the absolute tilt angle is calculated as the sum of the first and second tilt angle. (Due to the calibration process, both tilt angles, the first and the second, are determined at nearly the same precision).

With this method a relatively simple circuit design is possible. Ultimately, the object is to determine the position of the gas bubble at the highest resolution. Theoretically, therefore, the method must make it possible to evaluate the electric output quantities of the electrode configurations with the highest resolution. But in order to avoid having to conduct a high-resolution evaluation of all electrode configurations on a constant basis, a determination is first made of the electrode configuration within which the gas bubble is located. Only then the determined electrode configuration is connected to the aforementioned second electronic circuit. Only during this step a high-resolution evaluation is finally made of the electric output quantities of a single electrode configuration.

Further features of the invention are disclosed in the remaining description as follows and in the claims. Exemplary embodiments of the invention will be explained in more detail on the basis of drawings as follows.

DETAILED DESCRIPTION OF THE PREFERRED EMBODIMENTS

A conventional tiltsensor employing a spirit level 10 has one electrode configuration 11 comprising three electrodes f, i and j. The spirit level 10 is curved to correspond to an arc of a circle and is filled with an electrolytic liquid. The spirit level 10 also contains a small gas bubble 12 whose liquid buoyancy causes it to migrate to the highest position of the spirit level 10 and maintain its position there. In the drawing according to FIG. 1, the spirit level 10 is aligned with respect to the plumb direction (arrow 13) such that the gas bubble 12 maintains approximately the same distance to each end 14, 15 of the spirit level. This plumb-adjusted sensor position corresponds to its initial position after installation for monitoring movements of objects.

Figure 1:
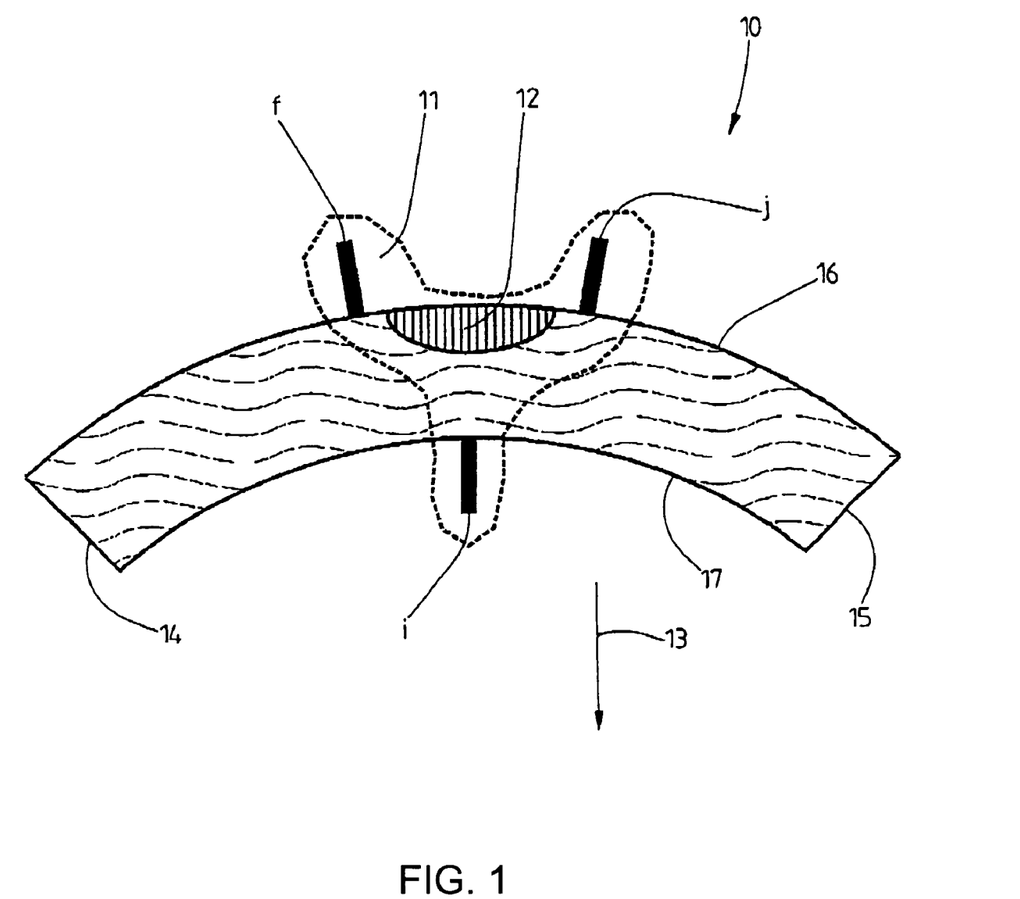
FIG. 1 illustrates a spirit level of a conventional tiltsensor, non-deflected (without tilt) and plumb adjusted.

As a result of its curved shape, the spirit level 10 has a top, outer side 16 and an opposite bottom, inner side 17. Arranged on the outer side 16 are the two electrodes f and j, which are spaced apart from each other, with the left electrode f being located at the same distance from the left end 14 as the right electrode j is from the right end 15. The distance between the two electrodes f and j is significantly greater than the extent of the gas bubble 12 along the outer side 16. The electrode i is centered between the electrodes f and j and at the same time is arranged opposite to them on the inner side 17.

The individual electrodes f, i, j are configured to have an almost punctiform contact surface for the electrolytic liquid. Punctiform means that the geometric dimensions of the electrodes are small in comparison to the extent of the spirit level 10 and/or gas bubble 12. Here the electrodes have, for example, a cross-sectional area of approximately 0.05 mm$^2$.

AC voltage is applied to the electrolyte by the electrodes f, i, j. An appropriate evaluation circuit, such as a resistance bridge, measures and compares the drop of potential between the electrodes f and i or between j and i. The ensuing electric quantity achieved as a result is a measure of the position of the gas bubble 12 within the spirit level 10. The gas bubble 12 itself exhibits relatively high electric resistance with respect to the electrolytic liquid.

The smallest changes in the tilt of the spirit level can be measured with the arrangement according to FIG. 1. Preferably, a measurement of tilt is most expedient up to the point where the gas bubble 12 is approximately centered below one of the electrodes f or j.

Figure 2:
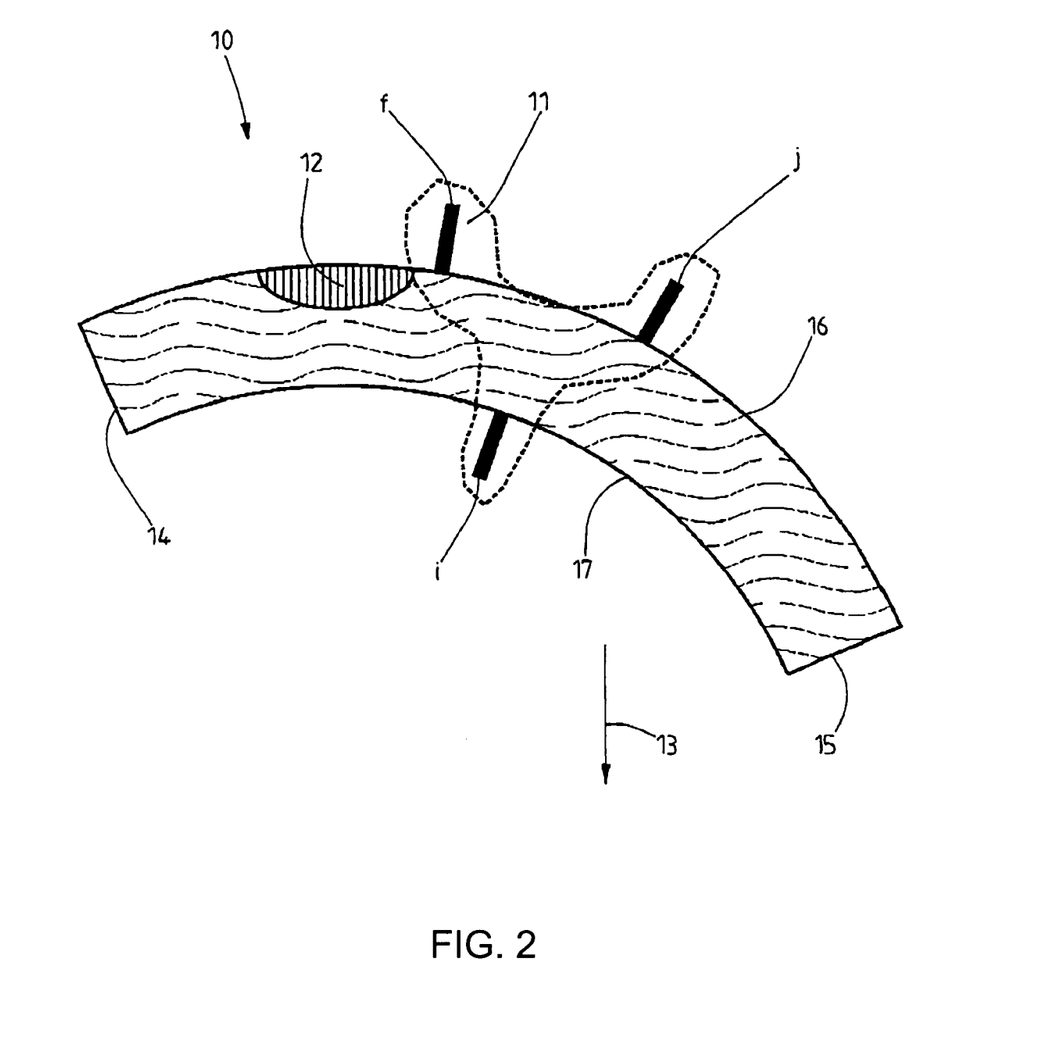
FIG. 2 illustrates a spirit level of a conventional tiltsensor with over-deflection (tilt exceeds the measuring range).

FIG. 2 shows a tilt of the spirit level 10 which can no longer be evaluated by a conventional tilt sensor. The gas bubble 12, having migrated completely outside the electrode configuration 11, no longer influences the electric quantities sufficient enough to be measured through electrodes f, j and i. The tilt of the spirit level 10 here in contrast to that shown in FIG. 1 is approximately 20° in one direction.

Figure 3:
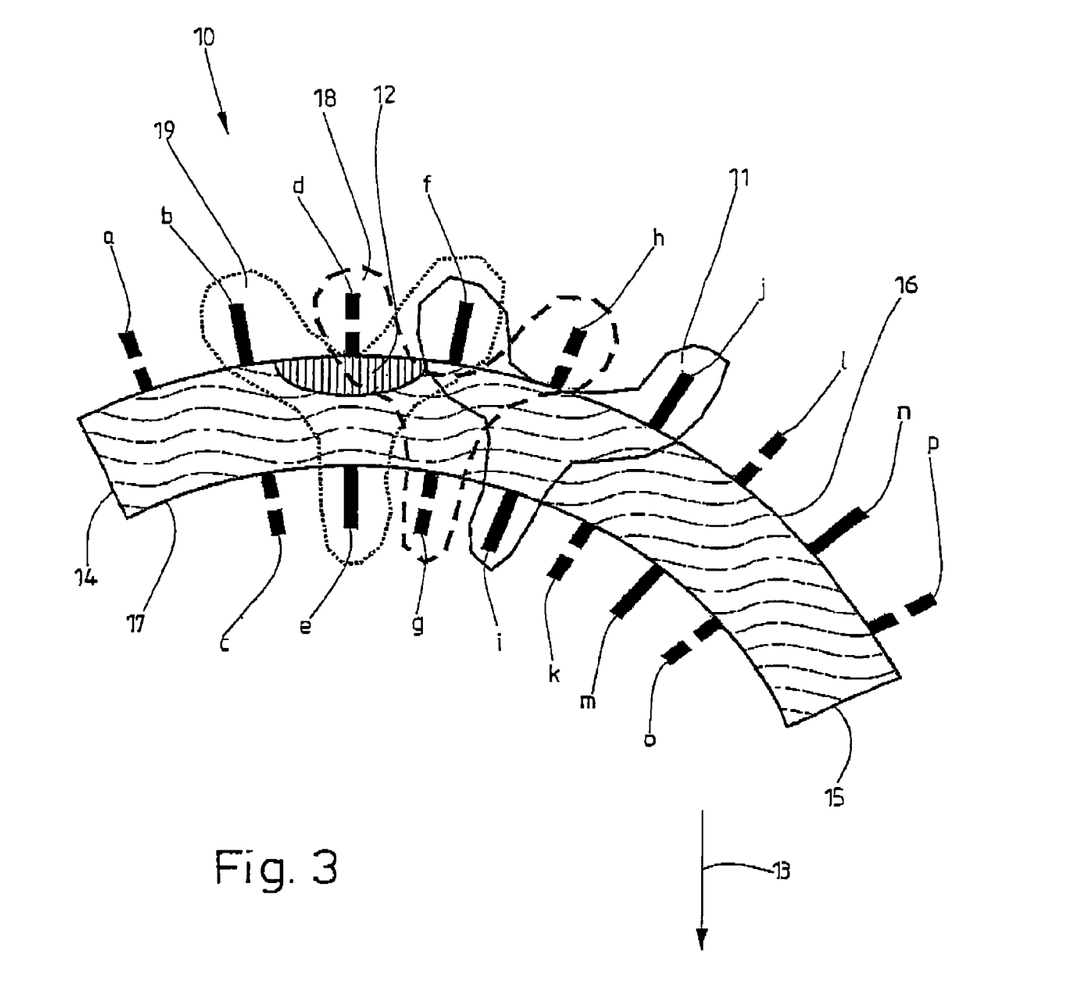
FIG. 3 illustrates a spirit level of a tiltsensor according to the invention, with deflection.

The same tilt angle with respect to the plumb direction (arrow 13) is assumed by the spirit level 10 in FIG. 3. But in this case there are a plurality of electrode configurations arranged along the spirit level 10, namely a total of seven electrode configurations corresponding to the number of electrodes at the inner, lower side 17. This sensor, in reference to the middle electrode configuration f, i, j, covers a tilt measuring range of ±40°. Here, too, each electrode configuration comprises three electrodes. The latter are labeled with the letters a to p. Specifically, the electrodes are arranged in opposite pairs, with each electrode on the inner side 17 having its own electrode configuration, namely by incorporating the two electrodes adjacent to the electrode lying directly opposite the inner electrode. For example, the electrode configuration 11 consists of the electrode i on the inner side 17 and electrodes f and j (of the outer side 16). The electrode h lying directly opposite to electrode i lies exactly between said electrodes f and j and is thus adjacent to them.

The next electrode configuration 18 to the left of configuration 11 is made up of the electrode g at the inner side 17 and the two electrodes d and h on the outer side 16. Lying between said electrodes d and h is the electrode f, which in turn forms a further electrode configuration 19 along with the electrode e of the inner side 17 and electrode b of the outer side 16. By virtue of this described arrangement, the electrode configurations overlap each other by 50% of their respective dimension in the extension-direction of the spirit level 10. In addition, the resulting electrode configurations in FIG. 3 are not all designated specifically but can be easily deduced from the specified electrodes a–p.

Figure 4:
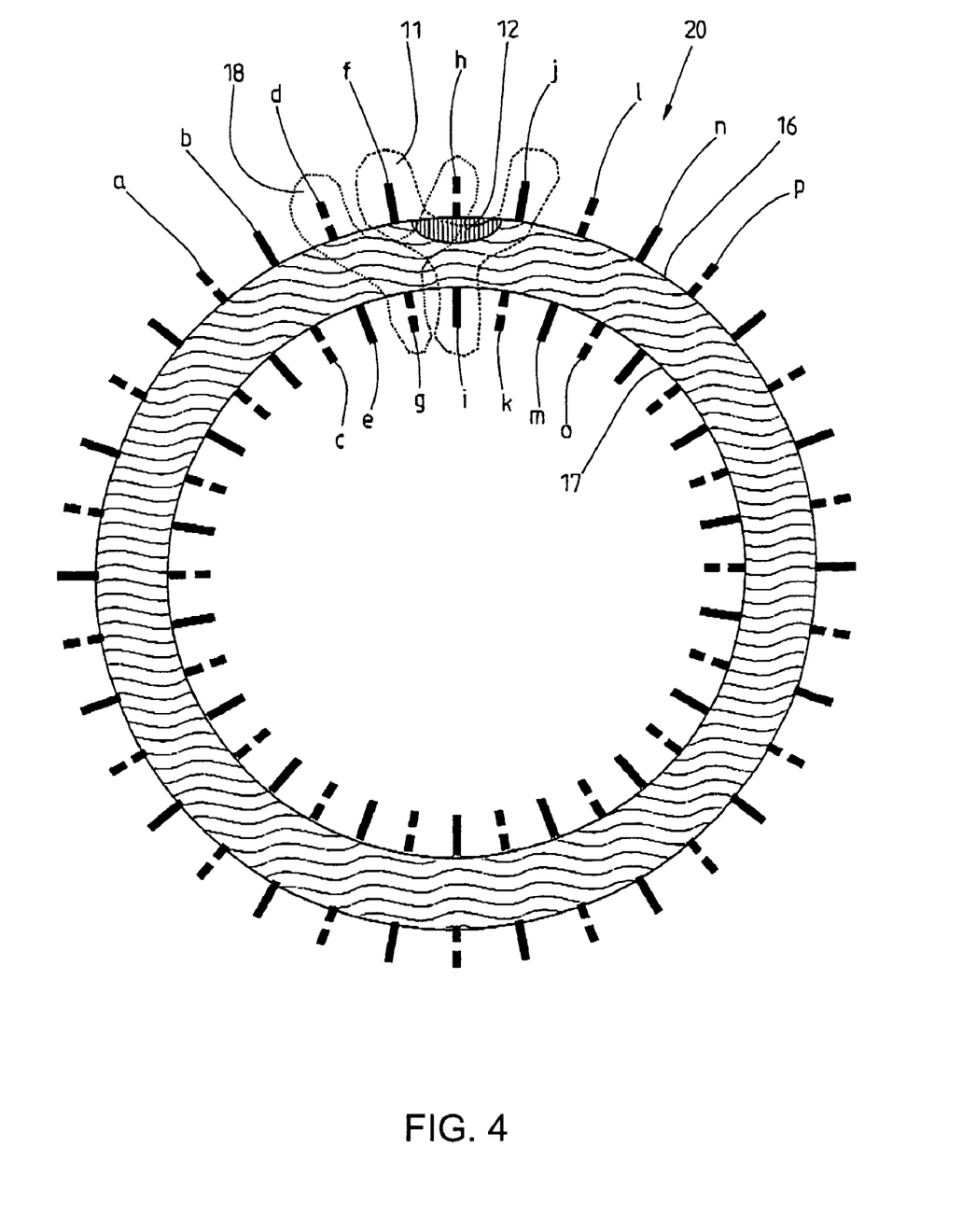
FIG. 4 illustrates a spirit level of a tiltsensor according to the invention having a 360° measuring range.

FIG. 4 shows another embodiment within the scope of the invention: a spirit level 20 that assumes a circular configuration to extend across a total of 360°. Electrodes and electrode configurations have the same relative spacing as those in FIG. 3. Due to the circular spirit level 20, the tilt angle measuring range is 360°, i.e. unlimited.

Figure 5:
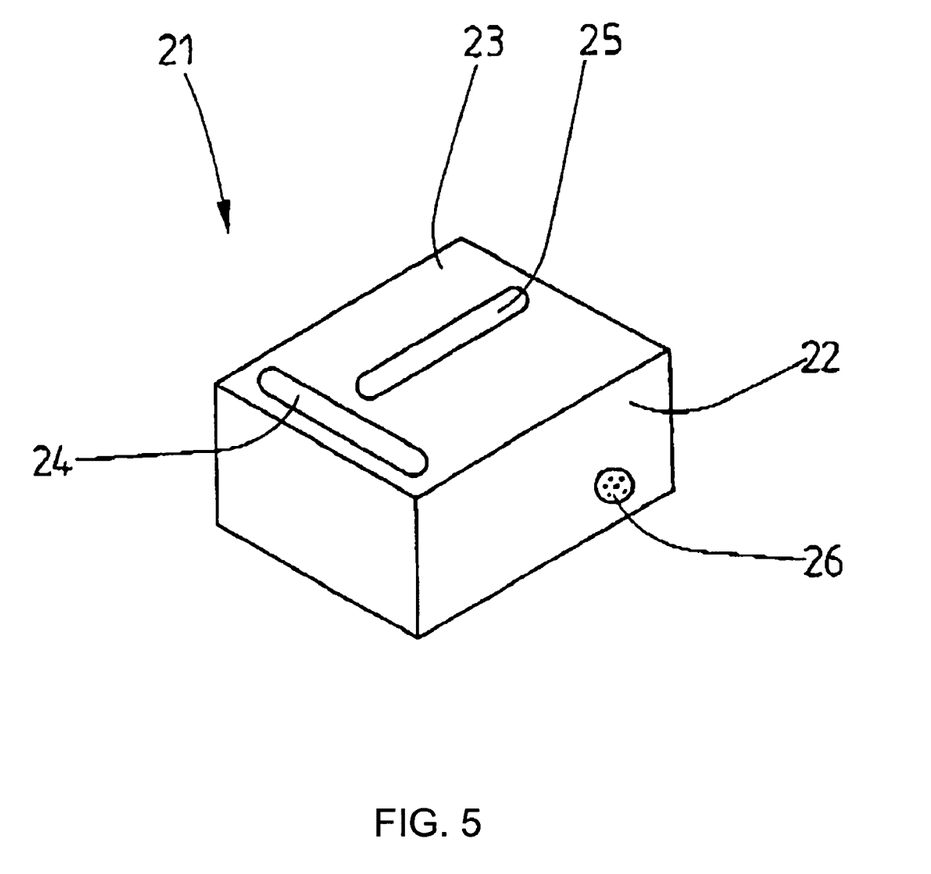
FIG. 5 illustrates a biaxial tiltsensor according to the invention with two spirit levels arranged in an orthogonal orientation to each other.
Figure 6:
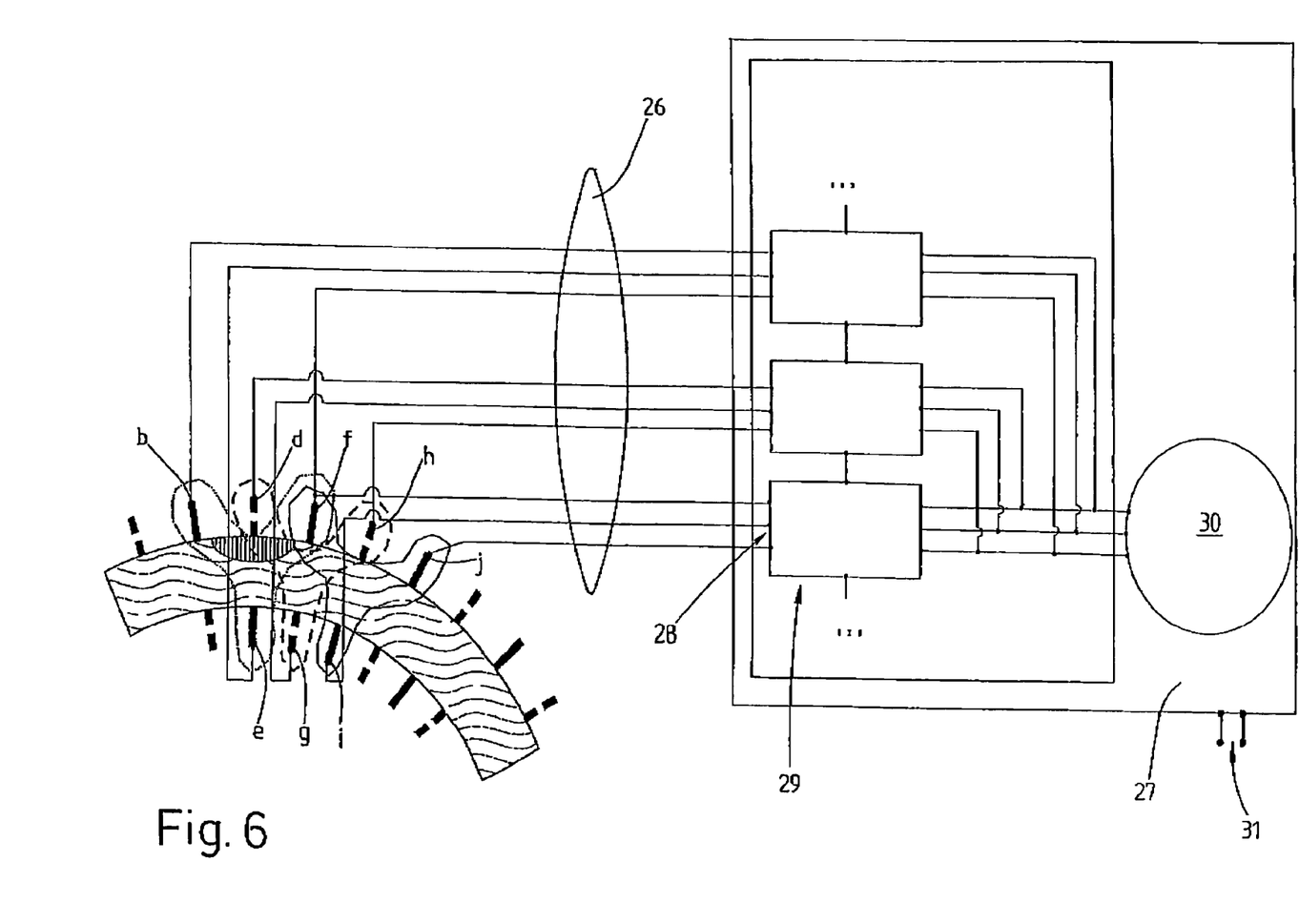
FIG. 6 is a schematic diagram illustrating the functioning of the tiltsensor's electronic circuits.

According to FIG. 5, a biaxial tiltsensor 21 has a cuboid housing 22, in whose top side 23 two elongate apertures 24, 25, oriented orthogonally to each other, are arranged for receiving one spirit level each. The housing 22 contains electric outputs 26 (for the electrodes a–p of each spirit level) as a means of connecting an evaluation circuit, which is mechanically separate from the housing 22. In FIG. 6 the schematic design of sensor and evaluation circuit 27 is illustrated as described below in the following.

The evaluation circuit 27 has connections 28 for all outputs 26 of the electrodes a to p (shown only in part) and is equipped with an internal power supply (not shown). In a first electronic circuit 29, the potential drops in each electrode configuration are first checked in one measuring cycle, thus determining the electrode configuration presently occupied by the gas bubble 12; in FIG. 3 this is electrode configuration 19 having the electrodes b, e and f. Then, the electrodes belonging to this electrode configuration are switched to the second electronic circuit 30. This circuit makes high-resolution measurements of the said electric quantities in order to determine the position of the gas bubble in the spirit level. The invention strives for, and achieves, an angular resolution that corresponds to the known tiltsensor having only one electrode configuration, but at a resolution clearly lower (and therefore better) than one microradiant, preferably approximately 0.1 microradiant.

The subcircuits (exactly one for each electrode configuration) belonging to the first electronic circuit 29 are connected by means of a communication wire to each other in order to compare their test results and to determine the first, coarse tilt angle. The system sensor-subcircuit-second circuit 30 is to be calibrated for each electrode configuration.

The subcircuits can measure, for example, the electric resistance between every two of the connected electrodes of the respective electrode configuration and calculate an average value from these three values. Each subcircuit then provides an average resistance value for its electrode configuration. The subcircuit in which the largest average value has been measured is the one in whose electrode configuration the gas bubble is located. There is the possibility that the same average value may be determined for two adjacent electrode configurations, specifically when the gas bubble extends into both electrode configurations in equal parts.

This problem can be solved by choosing the electrode configuration that has first determined its average value.

Due to the unambiguous assignment between electrode configuration and subcircuit, after the sensor has been calibrated, it is possible to allocate a precise angle to every subcircuit corresponding to the angular offset of the respective electrode configuration with respect to a selected reference electrode configuration, preferably the center configuration, which in FIG. 3 corresponds to the electrodes f, i, j. In order to determine sensor tilt, the second electronic circuit is used to determine a second, high-resolution angle in addition to the first, coarse angle (angular offset). The sum of the first, coarse angle and the second, high-resolution angle is then the tilt angle of the sensor. Finally the overall result is kept ready as an electric quantity that can be transmitted across an interface 31 to external devices, such as data loggers. For example, it is conceivable that the data can be sent to a transmitter that can then transfer the result to a remote receiver.

The above detailed description of the preferred embodiments, and the appended figures are for illustrative purposes only and are not intended to limit the scope and spirit of the invention, and its equivalents, as defined by the claims. One skilled in the art will recognize that many variations can be made to the invention disclosed in this specification without departing from the scope and spirit of the invention.

LIST OF DESIGNATIONS 10 spirit level
11 electrode configuration
12 gas bubble
13 plumb direction (arrow)
14 end of spirit level
15 end of spirit level
16 outer side of spirit level
17 inner side of spirit level
18 electrode configuration
19 electrode configuration
20 spirit level
21 tiltsensor
22 housing
23 top side of housing
24 aperture of housing
25 aperture of housing
26 electric outputs for electrodes a–p
27 evaluation circuit
28 connections for electric outputs for electrodes a–p
29 first electronic circuit
30 second electronic circuit
31 interface
a–p electrodes

What is claimed is:

1. A tiltsensor comprising:
   a) a closed spirit level curved over an angle of up to 360° and containing an electrolytic liquid and a gas bubble;
   b) a plurality of electrode configurations for sensing the position of the gas bubble and thus the tilt angle of the tiltsensor, wherein each of the plurality of electrode configurations has a plurality of electrodes and each of the plurality of electrode configurations are arranged along the spirit level, and wherein the electrodes are in electric contact with the electrolytic liquid; and
   c) a first electronic circuit to which the electrodes are connected for measuring electric quantities between selected electrodes,
   wherein the electrode configurations are arranged in succession along the spirit level and are arranged offset to each other at fixed angles such that the tilt angle measuring ranges associated with the electrode configurations overlap one another, in a seamless manner.

2. The tiltsensor according to claim 1, further comprising a second electronic circuit, wherein the first electronic circuit is provided for making a coarse determination of the location of the gas bubble and the second electronic circuit is provided for making a high-resolution determination of the location of the gas bubble within the spirit level, with the location of the gas bubble and thus the tilt angle of the sensor with respect to the plumb direction being composed of the additive coarse and high-resolution determinations of the gas-bubble's location.

3. The tiltsensor according to claim 2, wherein the first electronic circuit is provided for selecting one of the plurality of electrode configurations which is closest to the gas bubble or in which the gas bubble is located, and the second electronic circuit is provided to determine the location of the gas bubble within the selected electrode configuration.

4. The tiltsensor according to claim 2, wherein the first electronic circuit is taken into account in a calibration of the second electronic circuit for all of the electrode configurations and across the entire measuring range of the sensor.

5. The tiltsensor according to claim 1, wherein the first electronic circuit is provided for selecting one of the plurality of electrode configurations which is closest to the gas bubble or in which the gas bubble is located, and the second electronic circuit is provided to determine the location of the gas bubble within the selected electrode configuration.

6. The tiltsensor according to claim 1, comprising at least one electrode configuration, each comprising three electrodes, with one electrode in each electrode configuration being arranged on one side of the spirit level and the other electrodes in each electrode configuration being arranged on the opposite side of the spirit level.

7. The tiltsensor according to claim 1, wherein pairs of opposite electrodes are provided along the spirit level, in each case with one electrode forming the electrode configuration with the electrodes adjacent to the electrode opposite it.

8. The tiltsensor according to claim 1, wherein the spirit level with the electrode configurations extends over an angle of ±5–10°.

9. The tiltsensor according to claim 1, wherein the spirit level with the electrode configurations extends over an angle of ±30–40°.

10. A tiltsensor comprising:
    a) a closed spirit level curved over an angle of up to 360° and containing an electrolytic liquid and a gas bubble;
    b) a plurality of electrode configurations for sensing the position of the gas bubble and thus the tilt angle of the tiltsensor, wherein each of the plurality of electrode configurations has a plurality of electrodes and each of the plurality of electrode configurations are arranged along the spirit level, and wherein the electrodes are in electric contact with the electrolytic liquid; and
    c) a first electronic circuit to which the electrodes are connected for measuring electric quantities between selected electrodes,
    wherein at least one of the electrodes belongs to more than one electrode configuration.

11. The tilt sensor according to claim 10, comprising a plurality of electrode configurations provided along the spirit level, with adjacent electrode configurations spatially overlapping one another and sharing at least one electrode.

12. A tiltsensor comprising:
a) a closed spirit level curved over an angle of up to 360° and containing an electrolytic liquid and a gas bubble;
b) a plurality of electrode configurations for sensing the position of the gas bubble and thus the tilt angle of the tiltsensor, wherein each of the plurality of electrode configurations has a plurality of electrodes and each of the plurality of electrode configurations are arranged along the spirit level, and wherein the electrodes are in electric contact with the electrolytic liquid; and
c) first electronic circuit to which the electrodes are connected for measuring electric quantities between selected electrodes,
wherein adjacent electrode configurations, and thus the associated tilt angle measuring ranges, overlap by 50%.

13. A tiltsensor comprising:
a) a closed spirit level curved over an angle of up to 360° and containing an electrolytic liquid and a gas bubble;
b) a plurality of electrode configurations for sensing the position of the gas bubble and thus the tilt angle of the tiltsensor, wherein each of the plurality of electrode configurations has a plurality of electrodes and each of the plurality of electrode configurations are arranged along the spirit level, and wherein the electrodes are in electric contact with the electrolytic liquid; and
c) a first electronic circuit to which the electrodes are connected for measuring electric quantities between selected electrodes,
wherein the extension of the gas bubble in the spirit level is not larger than the smallest distance between the electrodes within the electrode configuration.

14. A tiltsensor comprising:
a) a closed spirit level curved over an angle of up to 360° and containing an electrolytic liquid and a gas bubble;
b) a plurality of electrode configurations for sensing the position of the gas bubble and thus the tilt angle of the tiltsensor, wherein each of the plurality of electrode configurations has a plurality of electrodes and each of the plurality of electrode configurations are arranged along the spirit level, and wherein the electrodes are in electric contact with the electrolytic liquid; and
c) a first electronic circuit to which the electrodes are connected for measuring electric quantities between selected electrodes,
wherein the electrodes exhibit a practically punctiform contact surface with the electrolytic liquid having a maximum size of 0.1 $mm^2$ or preferably a maximum size of 0.05 $mm^2$.

15. A tiltsensor comprising:
a) a closed spirit level curved over an angle of up to 360° and containing an electrolytic liquid and a gas bubble;
a plurality of electrode configurations for sensing the position of the gas bubble and thus the tilt angle of the tiltsensor, wherein each of the plurality of electrode configurations has a plurality of electrodes and each of the plurality of electrode configurations are arranged along the spirit level, and wherein the electrodes are in electric contact with the electrolytic liquid; and
c) a first electronic circuit to which the electrodes are connected for measuring electric quantities between selected electrodes,
comprising two spirit levels which assume an orthogonal orientation to one another and which are assigned to their respective electronic circuits.

* * * * *